US008602361B2

(12) United States Patent
Wood

(10) Patent No.: US 8,602,361 B2
(45) Date of Patent: Dec. 10, 2013

(54) LAMINAR FLOW MONITOR

(75) Inventor: Norman Wood, Chippenham (GB)

(73) Assignee: Airbus Operations Limited, Bristol (GB)

( * ) Notice: Subject to any disclaimer, the term of this patent is extended or adjusted under 35 U.S.C. 154(b) by 123 days.

(21) Appl. No.: 13/137,439

(22) Filed: Aug. 16, 2011

(65) Prior Publication Data

US 2012/0049002 A1 Mar. 1, 2012

(30) Foreign Application Priority Data

Aug. 26, 2010 (GB) .................................... 1014244

(51) Int. Cl.
*B64C 21/00* (2006.01)
*B64C 23/00* (2006.01)
*G01F 1/68* (2006.01)

(52) U.S. Cl.
USPC ............ 244/134 F; 244/204; 244/204.1; 244/205; 244/203; 244/134 R; 244/134 D; 73/861.71

(58) Field of Classification Search
USPC ....... 244/204, 204.1, 205, 203, 134 R, 134 D, 244/134 F; 73/147, 861.71, 118.03
See application file for complete search history.

(56) References Cited

U.S. PATENT DOCUMENTS

| 3,108,473 | A | * | 10/1963 | Serra et al. ................... 73/170.01 |
| 5,237,281 | A | * | 8/1993 | Webster et al. ................ 324/469 |
| 6,390,417 | B1 | * | 5/2002 | Yoshino ......................... 244/203 |
| 7,251,592 | B1 | | 7/2007 | Praisner et al. |
| 7,254,998 | B2 | * | 8/2007 | Rueger ............................. 73/147 |
| 7,415,876 | B2 | * | 8/2008 | Hubbard et al. ........... 73/170.05 |
| 2007/0095135 | A1 | * | 5/2007 | Rueger ............................. 73/147 |
| 2009/0090814 | A1 | | 4/2009 | Barbara et al. |
| 2009/0173837 | A1 | * | 7/2009 | Silkey et al. .................. 244/205 |

FOREIGN PATENT DOCUMENTS

WO WO 2009/034379 3/2009

OTHER PUBLICATIONS

Search Report for GB 1014244.6, dated Dec. 10, 2010.

* cited by examiner

*Primary Examiner* — Tien Dinh
*Assistant Examiner* — Michael Wang
(74) *Attorney, Agent, or Firm* — Nixon & Vanderhye P.C.

(57) ABSTRACT

A method of monitoring the performance of an aerodynamic surface of an aircraft. The aircraft is operated during a non-perturbed measurement period such that the flow of air over the surface is at least partially laminar. A parameter is measured which is indicative of the drag of the surface during the non-perturbed measurement period to provide non-perturbed drag data. Air flow is perturbed temporarily over the surface in a perturbed measurement period so that it undergoes a transition from laminar flow to turbulent flow. The parameter is also measured during the perturbed measurement period to provide perturbed drag data. The degree of laminar flow during the non-perturbed measurement period can then be estimated in accordance with the difference between the perturbed drag data and the non-perturbed drag data. An ice protection system can be used to perturb the air flow.

13 Claims, 3 Drawing Sheets

LAMINAR FLOW MONITOR

This application claims priority to GB Patent Application No. 1014244.6 filed Aug. 26, 2010, the entire content of which is hereby incorporated by reference.

FIELD OF THE INVENTION

The present invention relates to a method and apparatus for monitoring the performance of an aerodynamic surface of an aircraft, in particular to estimate the degree of laminar flow of air over the surface. The invention is typically, although not exclusively, used to monitor the performance of a natural laminar flow wing or tail surface.

BACKGROUND OF THE INVENTION

The deployment of natural laminar flow on aircraft wings and empennage can result in significant savings in drag and hence improved fuel burn. However, laminar flow is very sensitive to small surface imperfections and distortion which can result in premature transition to turbulence. It would therefore be desirable to provide a reliable method of checking the state of laminar flow in flight.

SUMMARY OF THE INVENTION

A first aspect of the invention provides a method of monitoring the performance of an aerodynamic surface of an aircraft, the method comprising operating the aircraft during a non-perturbed measurement period such that the flow of air over the surface is at least partially laminar; measuring a parameter which is indicative of the drag of the surface during the non-perturbed measurement period to provide non-perturbed drag data; temporarily perturbing the air flow over the surface in a perturbed measurement period so that it undergoes a transition from laminar flow to turbulent flow; measuring the parameter during the perturbed measurement period to provide perturbed drag data; and estimating the degree of laminar flow of the air during the non-perturbed measurement period in accordance with the difference between the perturbed drag data and the non-perturbed drag data.

A second aspect of the invention provides an aircraft comprising an aerodynamic surface, and apparatus for monitoring the performance of the surface by the method of the first aspect of the invention. The apparatus comprises means for measuring a parameter which is indicative of the drag of the surface; means for temporarily perturbing the air flow over the surface so that it undergoes a transition from laminar flow to turbulent flow; and a processor for estimating the degree of laminar flow of the air during the non-perturbed measurement period in accordance with the difference between the perturbed drag data and the non-perturbed drag data.

The difference between the perturbed drag data and the non-perturbed drag data is directly and unambiguously indicative of the degree of laminar flow over the wing during the non-perturbed data measurement, without being influenced by other factors which might influence the drag parameter, such as sensor drift, engine degradation or increased drag from some other part of the aircraft.

The airflow may be perturbed by any suitable means. For example the airflow may be perturbed by vibrating the aerodynamic surface using a device installed within or below the surface. Alternatively the airflow may be perturbed by transmitting an acoustic signal from an acoustic transducer parallel with the surface through the airflow adjacent the surface. However most preferably the airflow is perturbed by heating the surface. This has the advantage that it enables the airflow to be perturbed quickly and simultaneously over a wide area.

The airflow may be perturbed by the operation of an ice protection system which either removes or prevents the build up of ice on the surface. The ice protection system may for example heat the surface using an electro-thermal heating pad or using bleed air, or it may operate by pumping glycol from below the surface through a series of perforations in the surface. The use of an ice protection system is advantageous since many conventional aircraft already have such systems installed to remove ice from the surface or prevent ice building up on the surface. In conventional aircraft such systems are only operated during ascent and/or descent flight phases (typically under 7500 m) but when employed in the context of the present invention the ice protection system is typically also operated during a cruise phase (typically over 7500 m) to perturb the air flow and enable a measurement to be made. The use of an ice protection system enables the invention to be implemented with little or no weight, drag or cost penalty.

Typically the aerodynamic surface is a wing, tail surface, or nose cone of the aircraft.

Typically the aerodynamic surface has a leading edge and a trailing edge, the aircraft is operated during the non-perturbed measurement period such that the air flow over the surface experiences a favourable pressure gradient with pressure falling in the direction of air flow, and the favourable pressure gradient ends at a position on the surface which is aft of 20% of the chord distance from the leading edge to the trailing edge, and more preferably aft of 50% of chord. Such a favourable pressure gradient is characteristic of a natural laminar flow aerofoil, in comparison with a turbulent aerofoil where there is relatively little favourable pressure gradient.

Typically the aircraft is operated during the non-perturbed measurement period such that the air flow over the surface is laminar for over 20% of the chord distance from the leading edge to the trailing edge, and more preferably over 50% of chord. Again, this can be compared with a turbulent aerofoil where there is relatively little laminar flow.

Typically the surface is part of a natural laminar flow aerofoil.

The method may be performed only once during a flight, but more typically each step of the method is repeated to provide a series of estimates of the performance of the surface during a flight, either during a single non-perturbed measurement period or over a succession of such periods. These estimates can then be used in a number of ways to monitor the performance of the surface: for instance an average value can be taken to minimise random error, or the rate of change of the estimates may be monitored in order to detect an abrupt deterioration in the performance of the surface.

Typically an output is generated in accordance with the difference between the perturbed drag data and the non-perturbed drag data. The output may be an audible or visual output (such as a pilot warning) which is provided to a pilot in flight. For instance a pilot warning may be generated if the estimated degree or rate of change of laminar flow exceeds a predetermined threshold. Alternatively the output may be in the form of digital data stored on a suitable storage medium for later analysis.

The parameter can be any parameter which is either directly or indirectly indicative of the drag of the surface, for instance a parameter which indicates the engine loading of the aircraft. For instance it may comprise a fuel flow parameter which indicates the rate of flow of fuel into the aircraft's engine(s), a throttle position of an autopilot system, or the trim angle of an elevator or other control surface.

Typically the perturbations and measurements are performed autonomously under computer control.

Typically the or each perturbed measurement period lasts for less than one minute. One or more measurements may be made within each perturbed measurement period.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
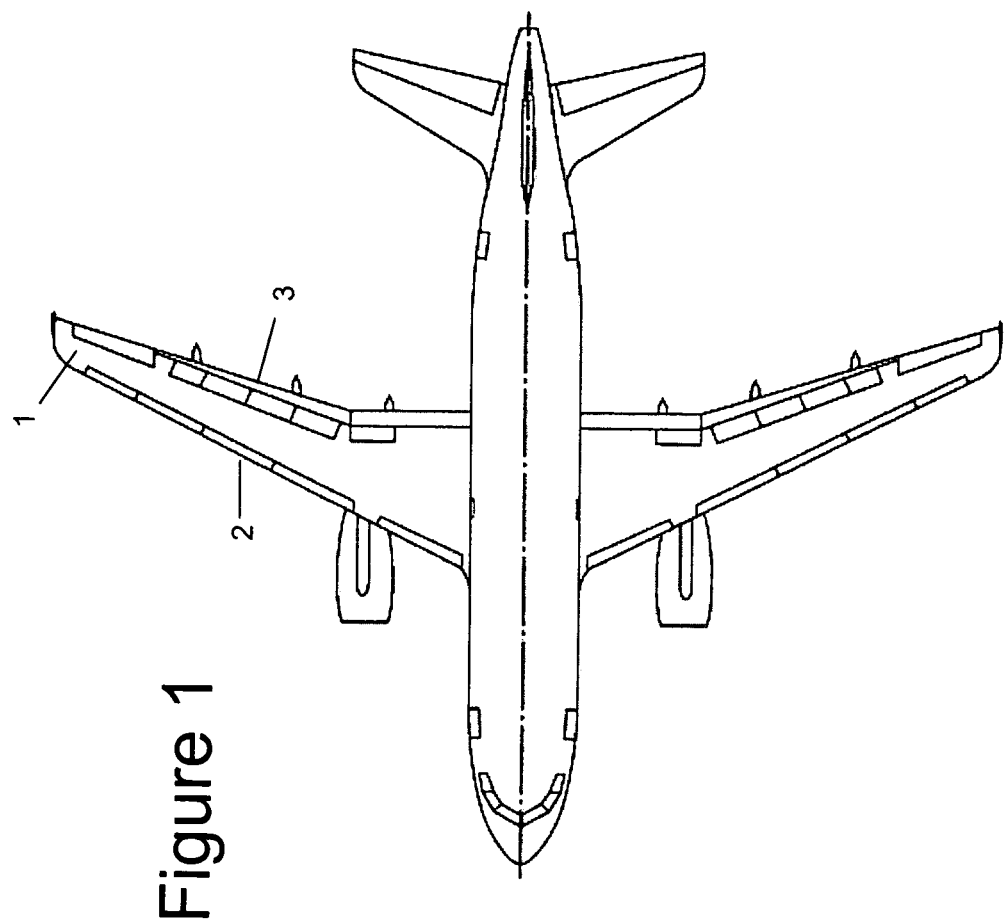
FIG. 1 is a plan view of an aircraft with natural laminar flow wings.

FIG. 1 is a plan view of an aircraft with natural laminar flow wings 1. Each wing has a leading edge 2 and a trailing edge 3.

Figure 2:
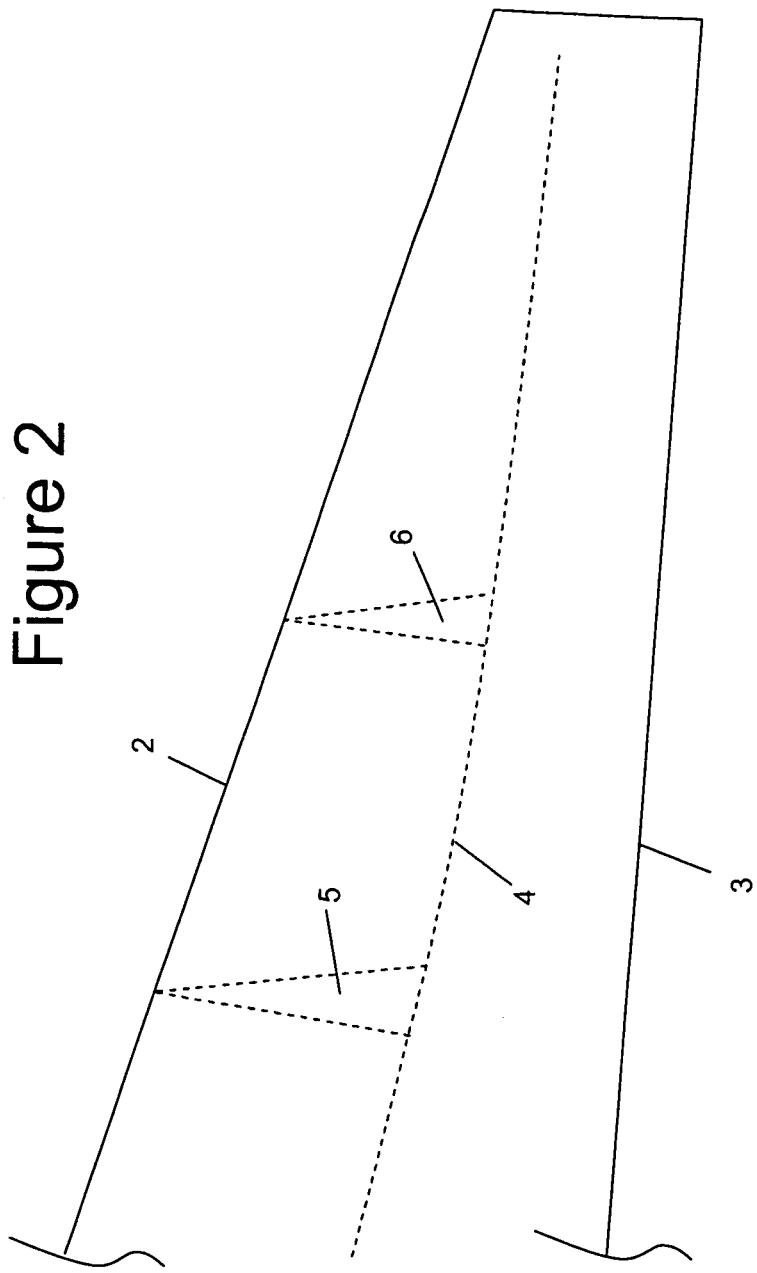
FIG. 2 is a schematic plan view of the wing showing the transition from laminar to turbulent flow.

The wings are designed so that air flowing over the upper surface experiences a favourable pressure gradient with pressure falling in the direction of air flow over a significant chord-wise extent. Typically the favourable pressure gradient starts towards the leading edge of the wing and ends somewhere between 30-75% of the chord distance from the leading edge to the trailing edge. Where this favourable pressure gradient exists, the air flow tends to remain laminar. FIG. 2 is a plan view of the wing 1, showing schematically a line 4 where the air flow over the upper surface of the aerofoil becomes turbulent. In this example the air flow over the surface is laminar for about 50% of the chord distance from the leading edge 2 to the trailing edge 3.

Laminar flow is very sensitive to small surface imperfections and distortion which can result in premature transition to turbulence. This is illustrated in FIG. 2 by way of two turbulent wedges 5, 6 caused by imperfections or distortions on the leading edge 2. A common cause of such imperfections can be erosion, or the accumulation of insects on the leading edge during climb and descent flight phases.

Figure 3:
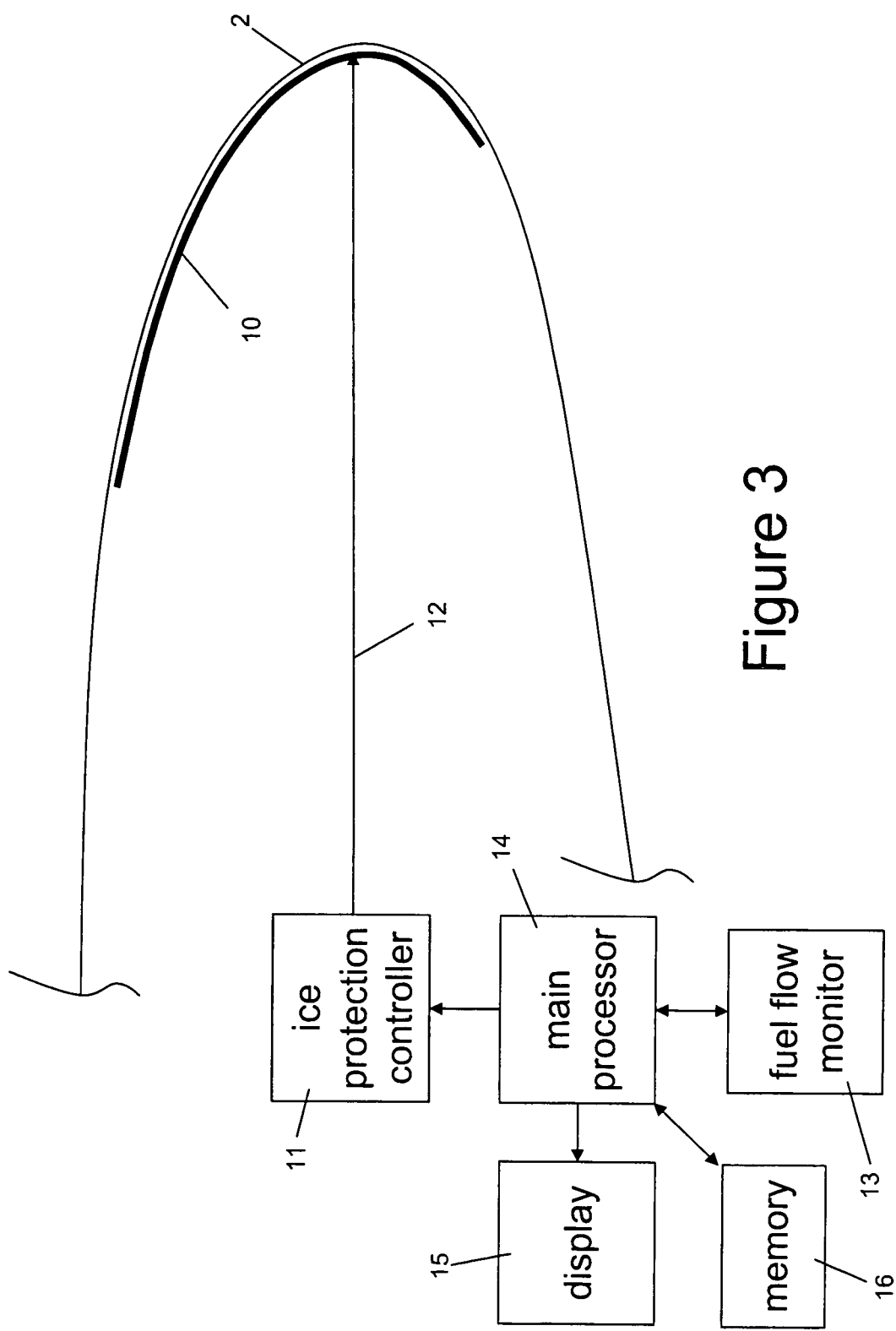
FIG. 3 is a schematic view of the leading edge of the wing, and apparatus for monitoring the performance of the wing during flight.

FIG. 3 shows the leading edge 2 of the wing. An electro-thermal ice protection system is provided to heat the leading edge skin and prevent the accumulation of ice. The ice protection system comprises an electro-thermal heater pad 10 beneath the surface of the leading edge skin, a controller 11, and an electric control line 12. The controller 11 can actuate the pad 10 when necessary via the control line 12. This causes the pad 10 to heat the leading edge skin to a temperature 20-100° C. higher than the airflow.

The leading edge skin is typically formed from a non-ferrous metal such as aluminium or titanium. Alternatively the skin may be formed from a laminar carbon-fibre composite material in which case the heater pad may be integrated into the laminate.

The controller 11 is programmed to actuate the pad 10 during ascent and/or descent flight phases under 25,000 feet to remove ice from the leading edge or prevent ice building up on the leading edge.

A fuel flow monitoring system 13 monitors the rate of flow of fuel into the aircraft's engines, thus providing an indication of the drag of the aircraft. The flow monitoring system 13 may measure the flow rate by a variety of means, including for example measuring the fuel velocity by sensing a pressure difference across a venturi with a pressure sensor.

As the leading edge becomes contaminated, then an increasing number of turbulent wedges 5, 6 will develop and gradually increase the drag of the aircraft. Eventually the flow may become fully turbulent at which point the total aircraft drag will have increased by 3-5% in comparison with the drag in the absence of any turbulent wedges.

Such an increase in drag will cause an equivalent increase in the fuel flow rate data measured by the fuel flow monitoring system 13. However an increase in the fuel rate data is not necessarily solely due to the development of turbulent wedges on the natural laminar flow wing. For instance it may be caused by a dent in some other part of the aircraft such as the tail fin, a degradation of the performance of the engine, drift in the pressure sensor of the fuel flow monitoring system 13, or many other possible reasons. Thus monitoring the fuel flow rate data alone cannot give a direct and unambiguous indication of the degree of laminar flow of air over the wing.

A solution to this problem is provided as follows. During a cruise phase over 7500 m (when the ice protection system is not usually actuated) a main processor 14 performs a series of measurements. In each measurement the main controller 14 instructs the ice protection controller 11 to actuate the pad 10 over a short perturbed measurement period, perhaps for a few seconds but typically for less than one minute. This heats the leading edge skin along its full span, thereby destabilising the laminar boundary layer and temporarily perturbing the air flow so that it undergoes a transition from laminar flow to turbulent flow. Thus the transition line 4 shown in FIG. 2 moves rapidly to the leading edge 2.

The fuel flow rate is measured by the system 13 during the perturbed measurement period to provide one or more perturbed drag data readings R(perturbed). Since the flow over the wing is now fully turbulent, then in the absence of turbulent wedges the drag will increase by a statistically significant amount, typically about 3-5%. After the reading(s) R(perturbed) have been made during the perturbed measurement period, then the main controller 14 instructs the ice protection controller 11 to de-actuate the pad 10 so the air flow becomes laminar again.

Before and after each perturbed measurement period there is a non-perturbed measurement period in which the pad 10 is de-actuated and the flow is at least partially laminar. One or more fuel flow rate measurements R(non-perturbed) are also made during these non-perturbed measurement periods.

As mentioned above, the data values R(perturbed) and R(non-perturbed) may change together for a number of reasons unrelated to the degree of laminar flow over the wing, for instance drift in the pressure sensor of the fuel monitoring system 13. However the difference between the perturbed drag data and the non-perturbed drag data (R(delta)=R(perturbed)−R(non-perturbed)) is directly and unambiguously indicative of the degree of laminar flow over the wing during the non-perturbed data measurement.

Thus if R(delta) falls below a certain threshold then it can be assumed that there are a large number of turbulent wedges 5, 6 on the wing during the non-perturbed measurement period.

The main processor 14 can then use R(delta) in a variety of ways in order to estimate the degree of laminar flow of the air during the non-perturbed measurement period and provide suitable indications to the pilot via a display device 15.

In its most basic form, the processor 14 may simply compare each individual R(delta) value with one or more predetermined threshold values, and issue warnings to the pilot as appropriate. For instance if R(delta) is close to zero then the wing is close to fully turbulent and a high level warning may be issued to the pilot so he can change the aircraft's altitude and/or speed to conserve fuel. A series of intermediate thresholds may also be set in order to give associated intermediate warnings to the pilot.

The threshold values could be defined to ensure "normal" operation consistent with the fuel allowance and reserves. For instance, the aircraft fuel reserves may be determined on the assumption that the flow is at least 80% laminar, and if the observed degree of laminar flow falls below 80% then suitable warnings may be issued.

Also, since each data value R(delta) is susceptible to random error, a series of R(delta) values may be measured and a rolling average R(average delta) taken to give a rolling average value which is less susceptible to such random error. R(average delta) can then be compared with the threshold(s). The rolling average may be restricted to R(delta) values within a particular mission, or the rolling average may be taken over a number of missions.

Furthermore, the rate of change dR(delta)/dt or dR(average delta)/dt may be monitored and an appropriate warning given if it exceeds a threshold, indicating an abrupt deterioration of laminar flow over the wing.

As well as being used to provide real-time pilot information, the raw data values R(perturbed) and R(non-perturbed), along with the derived data values R(delta), R(average delta), dR(delta)/dt, dR(average delta)/dt, are stored by the processor 14 as digital data on a suitable storage medium 16. The stored data can then be used in a number of ways. For instance data may be stored for a number of missions, and when the aircraft reaches cruise, the data for the current mission can be compared with data from the previous mission to determine whether there has been a significant degradation in laminar flow since the previous mission, indicating that some damage or contamination has occurred in the intervening period. Also the stored data can be used to provide a historical picture of the performance of the aircraft over a number of missions.

Although the invention has been described above with reference to one or more preferred embodiments, it will be appreciated that various changes or modifications may be made without departing from the scope of the invention as defined in the appended claims.

The invention claimed is:

1. A method of monitoring the performance of an aerodynamic surface of an aircraft, the method comprising the steps of:
    operating the aircraft during a non-perturbed measurement period such that the flow of air over the surface is at least partially laminar;
    measuring a parameter which is indicative of the drag of the surface during the non-perturbed measurement period to provide non-perturbed drag data;
    temporarily perturbing the air flow over the surface by heating the surface in a perturbed measurement period so that said airflow temporarily undergoes a transition from laminar flow to turbulent flow;
    measuring the parameter during the perturbed measurement period to provide perturbed drag data; and
    estimating the degree of laminar flow of the air during the non-perturbed measurement period in accordance with the difference between the perturbed drag data and the non-perturbed drag data.

2. The method of claim 1 wherein the airflow is perturbed by the operation of an ice protection system.

3. The method of claim 2 wherein the ice protection system is operated during ascent and/or descent flight phases to remove ice from the surface or prevent ice building up on the surface, and wherein the ice protection system is also operated during a cruise phase to perturb the air flow.

4. The method of claim 1 wherein the aerodynamic surface has a leading edge and a trailing edge, the aircraft is operated during the non-perturbed measurement period such that the air flow over the surface experiences a favourable pressure gradient with pressure falling in the direction of air flow, and the favourable pressure gradient ends at a position on the surface which is aft of 20% of the chord distance from the leading edge to the trailing edge.

5. The method of claim 1 wherein the aerodynamic surface has a leading edge and a trailing edge, and the aircraft is operated during the non-perturbed measurement period such that the air flow over the surface is laminar for over 20% of the chord distance from the leading edge to the trailing edge.

6. The method of claim 1 wherein the surface is part of a natural laminar flow aerofoil.

7. The method of claim 1 further comprising generating an output in accordance with the difference between the perturbed drag data and the non-perturbed drag data.

8. The method of claim 7 wherein the output is a visual or audible output which is provided to a pilot in flight.

9. The method of claim 1 wherein the parameter is a fuel flow parameter.

10. The method of claim 1 further comprising repeating each step of the method to provide a series of estimates of the performance of the surface during a flight.

11. The method of claim 1 wherein the perturbations and measurements are performed autonomously under computer control.

12. The method of claim 1 wherein the or each perturbed measurement period lasts for less than one minute.

13. An aircraft comprising an aerodynamic surface, and apparatus for monitoring the performance of the surface by the method of claim 1, the apparatus comprising:
    means for measuring a parameter which is indicative of the drag of the surface;
    means for temporarily perturbing the air flow over the surface so that it undergoes a transition from laminar flow to turbulent flow; and
    a processor for estimating the degree of laminar flow of the air during the non-perturbed measurement period in accordance with the difference between the perturbed drag data and the non-perturbed drag data.

* * * * *